(12) United States Patent
Wang

(10) Patent No.: US 11,124,190 B2
(45) Date of Patent: Sep. 21, 2021

(54) VEHICLE-FOLLOWING SPEED CONTROL METHOD, APPARATUS, SYSTEM, COMPUTER DEVICE, AND STORAGE MEDIUM

(71) Applicant: TENCENT TECHNOLOGY (SHENZHEN) COMPANY LIMITED, Shenzhen (CN)

(72) Inventor: Bin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 148 days.

(21) Appl. No.: 16/566,668

(22) Filed: Sep. 10, 2019

(65) Prior Publication Data

US 2020/0001871 A1    Jan. 2, 2020

Related U.S. Application Data

(63) Continuation of application No. PCT/CN2018/102650, filed on Aug. 28, 2018.

(30) Foreign Application Priority Data

Aug. 28, 2017   (CN) .......................... 201710749150.6

(51) Int. Cl.
*B60W 30/16*    (2020.01)
*B60W 30/14*    (2006.01)
(Continued)

(52) U.S. Cl.
CPC ........ *B60W 30/162* (2013.01); *B60W 30/143* (2013.01); *B60W 40/04* (2013.01); *G08G 1/052* (2013.01)

(58) Field of Classification Search
CPC .... B60W 30/17; B60W 30/162; B60W 30/14; B60W 30/143; B60W 40/04; B60W 30/16; B60W 30/165; G08G 1/052
See application file for complete search history.

(56) References Cited

U.S. PATENT DOCUMENTS

| 6,116,369 A * | 9/2000 | King | B60K 31/0008 |
| | | | 180/169 |
| 2009/0043474 A1* | 2/2009 | Nakai | B60W 10/11 |
| | | | 701/70 |

(Continued)

FOREIGN PATENT DOCUMENTS

| CN | 104637059 A | 5/2015 |
| CN | 104670235 A | 6/2015 |

(Continued)

OTHER PUBLICATIONS

The State Intellectual Property Office of the People's Republic of China (SIPO) Office Action 1 for 201710749150.6 dated Nov. 25, 2020 15 Pages (including translation).

(Continued)

*Primary Examiner* — Peter D Nolan
*Assistant Examiner* — Kenneth M Dunne
(74) *Attorney, Agent, or Firm* — Anova Law Group, PLLC

(57) ABSTRACT

A method for controlling vehicle-following speed includes: obtaining a speed of a host vehicle, a speed of a vehicle ahead of the host vehicle, and a current distance between the vehicle ahead and the host vehicle; and calculating a target vehicle-following distance according to the speed of the vehicle ahead and the speed of the host vehicle. A first acceleration is calculated according to the current distance, the target vehicle-following distance, the speed of the vehicle ahead, and the speed of the host vehicle; and a target acceleration is determined according to the first acceleration (Continued)

and a smooth-travel requirement. The speed of the host vehicle is controlled according to the target acceleration.

19 Claims, 11 Drawing Sheets

(51) Int. Cl.
*B60W 40/04* (2006.01)
*G08G 1/052* (2006.01)

(56) References Cited

U.S. PATENT DOCUMENTS

| | | | |
|---|---|---|---|
| 2011/0282559 A1* | 11/2011 | Isaji | B60W 30/16 |
| | | | 701/96 |
| 2015/0175162 A1* | 6/2015 | Nakadori | B60W 30/16 |
| | | | 701/96 |
| 2015/0224991 A1* | 8/2015 | Sudou | B60W 10/06 |
| | | | 701/96 |
| 2015/0307100 A1 | 10/2015 | Shimizu et al. | |
| 2016/0362105 A1 | 12/2016 | Kwon | |
| 2017/0021832 A1 | 1/2017 | Nakadori | |
| 2017/0072953 A1 | 3/2017 | Nemoto | |
| 2017/0072954 A1* | 3/2017 | Nemoto | B60W 30/16 |
| 2017/0072955 A1 | 3/2017 | Ediger et al. | |
| 2017/0072956 A1 | 3/2017 | Nemoto | |
| 2017/0080940 A1 | 3/2017 | Ito | |
| 2017/0217436 A1 | 8/2017 | Inomata | |
| 2018/0170381 A1* | 6/2018 | Kamatani | B60W 10/06 |
| 2018/0194336 A1* | 7/2018 | Lewandowski | B60T 7/22 |
| 2018/0237011 A1* | 8/2018 | Laurent | B60W 30/162 |
| 2019/0391259 A1* | 12/2019 | Shimizu | G01S 13/931 |
| 2021/0094542 A1* | 4/2021 | Horiguchi | B60W 30/143 |

FOREIGN PATENT DOCUMENTS

| | | | | |
|---|---|---|---|---|
| CN | 105109488 A | 12/2015 | | |
| CN | 105774804 A | 7/2016 | | |
| CN | 106240458 A | 12/2016 | | |
| CN | 106364476 A | 2/2017 | | |
| CN | 106428004 A | 2/2017 | | |
| CN | 106515733 A | 3/2017 | | |
| CN | 106515734 A | 3/2017 | | |
| CN | 106965810 A | 7/2017 | | |
| CN | 106965811 A | 7/2017 | | |
| CN | 107067753 | * | 8/2017 | G08G 1/052 |
| CN | 107067753 A | 8/2017 | | |
| JP | 2010111179 A | 5/2010 | | |

OTHER PUBLICATIONS

The World Intellectual Property Organization (WIPO) International Search Report for PCT/CN2018/102650 dated Nov. 22, 2018 6 Pages (including translation).

Zhuxuekui3 Blog, "Millimeter wave radar and monocular camera fusion", Apr. 17, 2017, Retrieved from the Internet: URL: http://www.cnblogs.com/zhuxuekui/p/6725734.html, [retrieved on Sep. 1, 2019], the whole document 9 Pages (including translation).

Yali Wang, "Study on Detection of Ahead Vehicle Based on Millimeter-Wave Radar-vision". Master's thesis of Jilin University, Changchun:Jilin University, 2013, the whole document 81 Pages.

* cited by examiner

VEHICLE-FOLLOWING SPEED CONTROL METHOD, APPARATUS, SYSTEM, COMPUTER DEVICE, AND STORAGE MEDIUM

CROSS-REFERENCES TO RELATED APPLICATIONS

This application is a continuation application of PCT Patent Application No. PCT/CN2018/102650, filed on Aug. 28, 2018, which claims priority to Chinese Patent Application No. 201710749150.6, entitled "VEHICLE-FOLLOWING SPEED CONTROL METHOD, APPARATUS, SYSTEM, COMPUTER DEVICE, AND STORAGE MEDIUM" filed with the Chinese Patent Office on Aug. 28, 2017, the entire contents of both of which are incorporated herein by reference.

FIELD OF TECHNOLOGY

This application relates to the field of computer processing, and in particular, to a vehicle-following speed control method, an apparatus, a system, a computer device, and a storage medium.

BACKGROUND OF THE DISCLOSURE

As the economy grows, a quantity of automobiles is increased rapidly, and urban traffic congestion becoming a serious issue. During a traveling process, a vehicle (i.e., host vehicle) needs to maintain a proper safe distance from a vehicle ahead. If a speed of the vehicle ahead changes, the host vehicle also needs to adjust a speed at any time. This requires highly concentrated attention of a driver, and brings enormous mental pressure to the driver.

There are mainly two conventional ways to resolve such a problem. One is mounting a Forward Collision Warning System (FCWS). The FCWS can detect a vehicle ahead and warn a driver when there is a collision risk, but does not take any braking action to avoid collision or control a vehicle. The other is Adaptive Cruise Control (ACC). When there is a collision risk, a vehicle can perform active brake intervention. However, when the ACC controls a vehicle to accelerate or decelerate, the ACC merely performs adjustment according to a current distance and a specified safe vehicle-following distance, and is likely to cause the vehicle to continuously accelerate or decelerate and bump, leading to relatively power vehicle-following stability and comfort.

SUMMARY

Based on this, with respect to the foregoing problem of poor vehicle-following stability and comport, it is necessary provide a vehicle-following speed control method, an apparatus, a system, a computer device, and a storage medium that have relatively high stability and comfort.

A vehicle-following speed control method is provided, including: obtaining a speed of a host vehicle, a speed of a vehicle ahead of the host vehicle, and a current distance between the vehicle ahead and the host vehicle; and calculating a target vehicle-following distance according to the speed of the vehicle ahead and the speed of the host vehicle. A first acceleration is calculated according to the current distance, the target vehicle-following distance, the speed of the vehicle ahead, and the speed of the host vehicle; and a target acceleration of the host vehicle is determined according to the first acceleration and a smooth-travel requirement.

A vehicle-following speed control apparatus is provided, including: an obtaining module, configured to obtain a speed of a host vehicle, a speed of a vehicle ahead of the host vehicle, and a current distance between the vehicle ahead and the host vehicle; a distance calculation module, configured to calculate a corresponding target vehicle-following distance according to the speed of the vehicle ahead and the speed of the host vehicle; an acceleration calculation module, configured to calculate a first acceleration according to the current distance, the target vehicle-following distance, the speed of the vehicle ahead, and the speed of the host vehicle; and a control module, configured to determine a target acceleration of the host vehicle according to the first acceleration and a smooth-travel requirement.

A vehicle-following speed control system is provided, including: a sensor unit, configured to capture a speed of a host vehicle, a relative speed between a vehicle ahead and the host vehicle, and a current distance between the vehicle ahead and the host vehicle; a central processing unit, including the vehicle-following speed control apparatus in any one of the foregoing embodiments and configured to determine a target acceleration according to the vehicle-following speed control apparatus, and send the determined target acceleration to a controller unit; and the controller unit, configured to control a traveling speed of the host vehicle according to the target acceleration.

A computer device is provided, including: a memory and a processor, the memory storing a computer program, and the computer program, when executed by the processor, causing the processor to execute the computer program to perform the following steps: obtaining a speed of a host vehicle, a speed of a vehicle ahead of the host vehicle, and a current distance between the vehicle ahead and the host vehicle; and calculating a target vehicle-following distance according to the speed of the vehicle ahead and the speed of the host vehicle. A first acceleration is calculated according to the current distance, the target vehicle-following distance, the speed of the vehicle ahead, and the speed of the host vehicle; and a target acceleration of the host vehicle is determined according to the first acceleration and a smooth-travel requirement.

A non-transitory computer-readable storage medium is provided, storing a computer program, the computer program, when being executed by a processor, performing the following steps: obtaining a speed of a host vehicle, a speed of a vehicle ahead of the host vehicle, and a current distance between the vehicle ahead and the host vehicle; and calculating a target vehicle-following distance according to the speed of the vehicle ahead and the speed of the host vehicle. A first acceleration is calculated according to the current distance, the target vehicle-following distance, the speed of the vehicle ahead, and the speed of the host vehicle; and a target acceleration of the host vehicle is determined according to the first acceleration and a smooth-travel requirement.

In the foregoing vehicle-following speed control method, apparatus, system, computer device, and storage medium, calculating a first acceleration according to a current distance, a target vehicle-following distance, a speed of a vehicle ahead, and a speed of a host vehicle is more flexible and accurate than the foregoing way of determining an acceleration merely according to a preset parameter, and further, after the first acceleration is calculated according to the current distance, the target vehicle-following distance, the speed of the vehicle ahead, and the speed of the host vehicle, it also needs to obtain a smooth range, determine a target acceleration according to the first acceleration and the smooth range, and then, control a traveling speed of the host vehicle according to the target acceleration. In this method, a smooth range is set to enable a vehicle to maintain smooth traveling within a specific range, avoid frequent switching between acceleration and deceleration, and improve comfort and stability.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
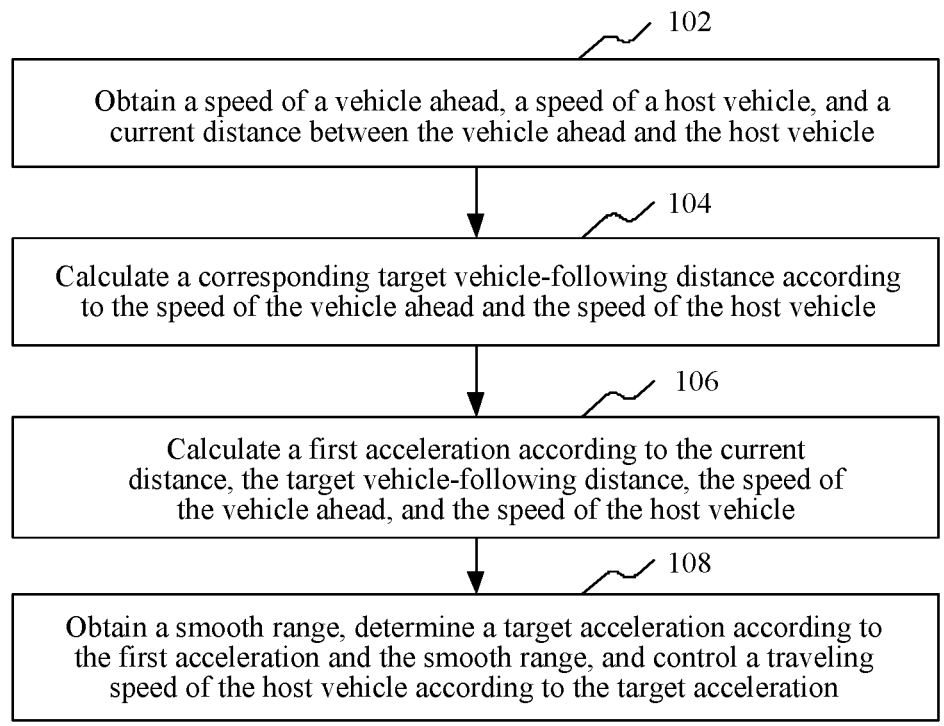
FIG. 1 is a method flowchart of a vehicle-following speed control method in an embodiment.

As shown in FIG. 1, in an embodiment, a vehicle-following speed control method is provided. The method includes the following steps.

Step 102: Obtain a speed of a host vehicle, a speed of a vehicle ahead of the host vehicle, and a current distance between the vehicle ahead and the host vehicle.

The vehicle ahead (also referred to as "a guiding vehicle in front"), and is a vehicle in front that is in a lane the same as that of the host vehicle and that is closest to the host vehicle. The host vehicle is a currently controlled vehicle, that is, an own vehicle. The speed of the vehicle ahead is an actual traveling speed of the vehicle ahead. The speed of the host vehicle is an actual traveling speed of the host vehicle. The current distance between the vehicle ahead and the host vehicle is a detected current distance between the vehicle ahead and the host vehicle. Optionally, the speed of the host vehicle may be directly measured by using a vehicle information capturing apparatus (for example, a vehicle speed sensor) of the host vehicle. The relative speed between the vehicle ahead and the host vehicle and the current distance between the vehicle ahead and the host vehicle may be detected by using a radar (for example, a millimeter-wave radar). If the speed of the host vehicle is known, the speed of the vehicle ahead can be determined by means of relative conversion.

In an embodiment, to accurately determine the vehicle ahead, interference of another vehicle is excluded. Before the step of obtaining a speed of a vehicle ahead and a current distance between the vehicle ahead and the host vehicle, the method further includes: determining a vehicle ahead corresponding to the host vehicle. Optionally, the vehicle ahead may be determined by capturing video or image information in front of the host vehicle, and then, identifying the captured video or image information by using an image feature identification algorithm to obtain vehicle information and lane line information in the video or image information, and then, the vehicle ahead corresponding to the host vehicle may be determined according to a positional relationship between the vehicle information and the lane line information. The video or image may be captured by using a camera of capturing apparatus. The capturing apparatus may be an industrial camera or an apparatus capable of photographing a video or an image such as a video capturing apparatus.

Step 104: Calculate a corresponding target vehicle-following distance according to the speed of the vehicle ahead and the speed of the host vehicle.

The target vehicle-following distance is a standard distance that should be maintained between the vehicle ahead and the host vehicle. The target vehicle-following distance is positively correlated to the speed of the host vehicle, and is negatively correlated to the speed of the vehicle ahead. That is, if other conditions are unchanged, a higher speed of the host vehicle indicates that a corresponding target vehicle-following distance is larger. Likewise, a higher speed of the vehicle ahead indicates that a corresponding target vehicle-following distance is smaller. When the speed of the host vehicle is relatively high, the target vehicle-following distance is adjusted to a relatively large value, so that a collision accident can be avoided better. When the speed of the vehicle ahead is relatively high, the target vehicle-following distance is adjusted to a relatively small value, so that a collision accident can be avoided. The target vehicle-following distance calculated by using the speed of the vehicle ahead and the speed of the host vehicle can be closer to actual requirements.

In an embodiment, the target vehicle-following distance may be set to a difference between the speed of the host vehicle and the speed of the vehicle ahead multiplied by a preset coefficient and then, added with a preset distance (that is, a corresponding distance when the speed of the vehicle ahead is consistent with the speed of the host vehicle), and may be obtained by using the following formula: $L=L_1+(v_s-v_q)*k_1$, where L is a target vehicle-following distance, $L_1$ is a preset distance (which, for example, is set to 5 m), $v_s$ is a speed of a host vehicle, $v_q$ is a speed of a vehicle ahead, and $k_1$ is a preset coefficient.

Step 106: Calculate a first acceleration according to the current distance, the target vehicle-following distance, the speed of the vehicle ahead, and the speed of the host vehicle.

Acceleration, as used herein, may refer to both acceleration and deceleration depending on the application situation. In other words, the value of the acceleration may be a positive value (e.g., corresponding to speeding up) or a negative value (e.g., corresponding to braking or other mechanisms to slow down a vehicle).

The first acceleration is an acceleration that is needed for maintaining the current distance and the target vehicle-following distance consistent. To make the calculated first acceleration closer to actual, the first acceleration is calculated according to the current distance, the target vehicle-following distance, the speed of the vehicle ahead, and the speed of the host vehicle, where the first acceleration is positively correlated to the current distance, is negatively correlated to the target vehicle-following distance, is positively correlated to the speed of the vehicle ahead, and is negatively correlated to the speed of the host vehicle. That is, if other conditions are unchanged, a larger current distance indicates a higher first acceleration. Likewise, a larger target vehicle-following distance indicates a smaller first acceleration. A higher speed of the vehicle ahead indicates a higher corresponding first acceleration. A lower speed of the host vehicle indicates a higher first acceleration. The first acceleration is an acceleration including a direction, and if the first acceleration is negative, it indicates deceleration motion. Maintaining the first acceleration consistent with the acceleration that needs to be adjusted in an actual situation, compared with conventionally adjusting a distance merely according to a fixed acceleration, is closer to actual requirements.

Step 108: Obtain a smooth range, determine a target acceleration according to the first acceleration and the smooth range, and control a traveling speed of the host vehicle according to the target acceleration.

The smooth range, or a smooth-travel condition/requirement, indicates a range of speeds or accelerations in which the host vehicle would travel smoothly/steadily. The smooth range may be a preset smooth-travel acceleration range, and if the calculated first acceleration falls within the smooth-travel acceleration range, the host vehicle is considered as traveling smoothly or steadily. After first acceleration is calculated, a final target acceleration is further determined according to the first acceleration and the smooth range, and then, a traveling speed of the host vehicle is controlled (the current speed of the host vehicle may be adjusted) according to the target acceleration. In an embodiment, if the calculated first acceleration falls within the smooth range, the target acceleration is obtained by adjusting the value of the first acceleration, to ensure the host vehicle to smoothly travel. If the calculated first acceleration does not fall within the smooth range, the first acceleration may be directly used as a target acceleration for controlling a traveling speed of the host vehicle.

In the foregoing vehicle-following speed control method, calculating a first acceleration according to a current distance, a target vehicle-following distance, a speed of a vehicle ahead, and a speed of a host vehicle is more flexible and accurate than the foregoing way of determining an acceleration merely according to a preset parameter, and further, after the first acceleration is calculated according to the current distance, the target vehicle-following distance, the speed of the vehicle ahead, and the speed of the host vehicle, a smooth range is obtained, a target acceleration is determined according to the first acceleration and the smooth range, and then, a traveling speed of the host vehicle is controlled according to the target acceleration. In this method, a smooth range is set to enable a vehicle to maintain smooth traveling within a specific range, avoid frequent switching between acceleration and deceleration, and improve comfort and stability.

The foregoing vehicle-following speed control method may be executed by, but not limited to, a host vehicle (that is, the currently controlled vehicle). The vehicle may include, but is not limited to, a driverful vehicle or a driverless vehicle. A program for performing the foregoing vehicle-following speed control method is applied to a system of a driverful vehicle, and the program may be run to help a driver to control a vehicle-following speed of the vehicle. A program for performing the foregoing vehicle-following speed control method is applied to a system of a driverless vehicle, and the program may be run to enable the vehicle to control a vehicle-following speed thereof.

The vehicle-following speed control method may be performed by, but not limited to, an electronic device that establishes a connection to the host vehicle. The electronic device may include, but is not limited to, a mobile device such as a mobile phone, a tablet computer, a PC computer, a notebook computer, or an intelligent wearable device. An application (APP), a script file, or the like for performing the foregoing vehicle-following speed control method is installed in the mobile device, the mobile device establishes a connection to the host vehicle, interacts with the host vehicle by running the APP or script file, and controls a vehicle-following speed of the host vehicle. Alternatively, the electronic device may further include, but is not limited to, a controller. The controller may be mounted on the host vehicle or an independent device, and controls the vehicle-following speed by establishing a connection to the host vehicle.

It should be noted that, in this application, the foregoing vehicle-following speed control method may be applied to, but not limited to, vehicles in various forms. This application does not limit a form of the vehicle. For example, the vehicle may be, but is not limited to, an automobile, a train, a tram, an engineering vehicle, a balance bike, a bicycle, a locomotive, a boat, an airplane, a helicopter, and the like.

In an embodiment, the smooth range is a smooth-travel acceleration range, and step 108 of obtaining a smooth range, determining a target acceleration according to the first acceleration and the smooth range, and controlling a traveling speed of the host vehicle according to the target acceleration includes: determining that the target acceleration is 0, and controlling the host vehicle to maintain current traveling motion when the first acceleration falls within the smooth-travel acceleration range.

In some embodiments, the smooth range includes a range where no adjustment to the current motion is needed to maintain a smooth ride. In other words, the host vehicle is traveling at a relatively uniform speed and/or acceleration (e.g., no abrupt acceleration or deceleration). When the calculated first acceleration falls within the smooth-travel acceleration range, the host vehicle is controlled to maintain current traveling motion (e.g., maintaining current speed or current acceleration). Optionally, the smooth-travel acceleration range is preset. For example, the smooth-travel acceleration range is set to [−1, 0.5]. When the calculated first acceleration falls within the smooth-travel acceleration range, the target acceleration is set to 0. That is, in this case, the speed and/or acceleration is unchanged, and the host vehicle is controlled to maintain traveling at a current speed and/or acceleration. The smooth-travel acceleration range is set to enable the vehicle to maintain traveling at a current speed and/or acceleration, thereby improving comfort and stability.

Figure 2:
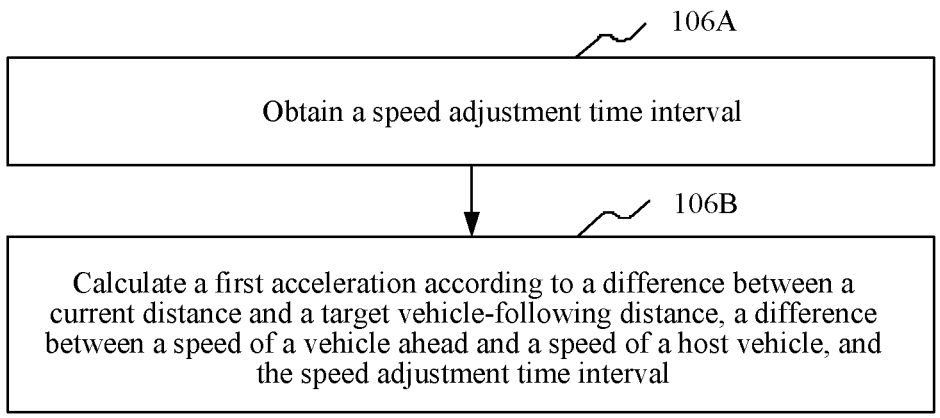
FIG. 2 is a method flowchart of calculating a first acceleration in an embodiment.

As shown in FIG. 2, in an embodiment, step 106 of calculating a first acceleration according to the current distance, the target vehicle-following distance, the speed of the vehicle ahead, and the speed of the host vehicle includes the following steps.

Step 106A: Obtain a speed adjustment time interval.

The speed adjustment time interval indicates a time to be passed before adjusting the current distance to the target vehicle-following distance. A magnitude of the speed adjustment time interval may be flexibly adjusted according to requirements, and may, for example, be set to 3 s for a lightweight automobile or 4 s for a heavyweight automobile. The speed adjustment time interval is flexibly set, so that an amplitude by which an acceleration is adjusted is controlled better.

Step 106B: Calculate the first acceleration according to a difference between the current distance and the target vehicle-following distance, a difference between the speed of the vehicle ahead and the speed of the host vehicle, and the speed adjustment time interval.

The first acceleration is positively correlated to a difference between the current distance and the target vehicle-following distance. That is, if other conditions are unchanged, a larger difference between the current distance and the target vehicle-following distance requires a higher acceleration. The first acceleration is also positively correlated to a difference between the speed of the vehicle ahead and the speed of the host vehicle. The first acceleration is negatively correlated to the speed adjustment time interval. That is, a larger adjustment time interval corresponds to a lower first acceleration. In an optional embodiment, assuming that the target vehicle-following distance is L, the current distance is d, $v_s$ is the speed of the host vehicle, $v_q$ is the speed of the vehicle ahead, and dt is the speed adjustment time interval, the first acceleration a of the host vehicle may be calculated by using the following formula:

$$a = \frac{2*(d-L)}{dt*dt} + \frac{2*(v_q-v_s)}{dt}.$$

A calculation model of the first acceleration is calculated according to a difference between the current distance and the target vehicle-following distance, the speed of the vehicle ahead, the speed of the host vehicle, and the speed adjustment time, is more suitable for operation of an acceleration in real life scenarios, may adjust an amplitude of an acceleration by flexibly setting the speed adjustment time interval, and is applicable to a broader range.

In an embodiment, the foregoing vehicle-following speed control method further includes: using, if the calculated first acceleration is greater than a preset first threshold, the first threshold as the first acceleration; and using, if the calculated first acceleration less than a preset second threshold, the second threshold as the first acceleration. In some embodiments, the preset first threshold is greater than the preset second threshold.

Optionally, a range of the first acceleration may be preset, a maximum end point value within the range is used as a first threshold, and a minimum end point value within the range is used as a second threshold. When the calculated first acceleration is greater than a preset first threshold, the first threshold is used as the first acceleration, and similarly, when the calculated first acceleration is less than a preset second threshold, the second threshold is used as the first acceleration. For example, a range of the first acceleration is preset to [−4, 1.5], when the first acceleration is greater than 1.5, a maximum value 1.5 within the range is used as the first acceleration, and if the first acceleration is less than −4, a minimum value −4 is used as the second acceleration. If the calculated first acceleration falls within the preset range, an actually calculated value is used as the first acceleration.

Figure 3:
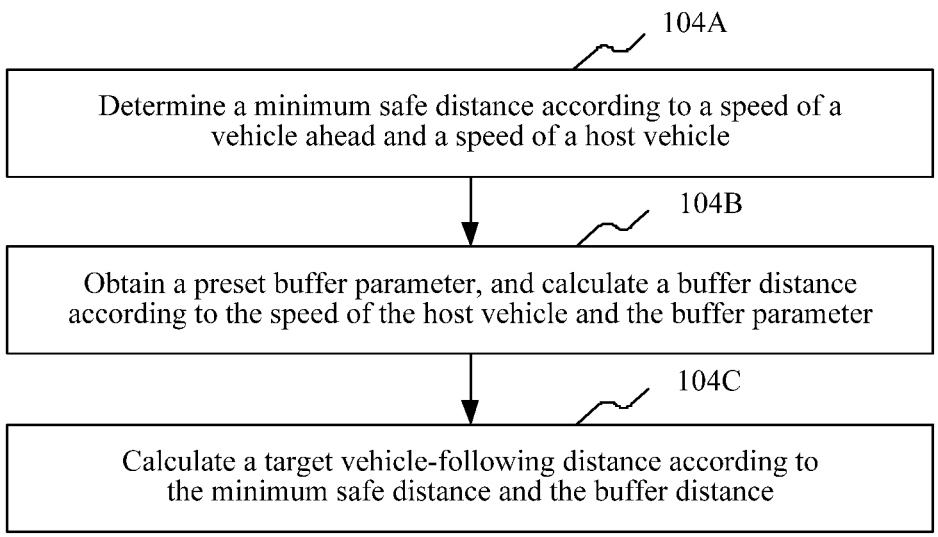
FIG. 3 is a method flowchart of calculating a target vehicle-following distance in an embodiment.

As shown in FIG. 3, in an embodiment, step 104 of calculating a corresponding target vehicle-following distance according to the speed of the vehicle ahead and the speed of the host vehicle includes the following steps.

Step 104A: Determine a minimum safe distance according to the speed of the vehicle ahead and the speed of the host vehicle.

The minimum safe distance indicates a minimum safe distance that needs to be maintained between the vehicle ahead and the host vehicle. The minimum safe distance is negatively correlated to the speed of the vehicle ahead, and is positively correlated to the speed of the host vehicle. In an embodiment, the minimum safe distance may be calculated by using the following formula: $L_S = v_s^2/2a_s - v_q^2/2a_q + L_0$, where $L_S$ is a minimum safe distance, $v_s$ is a speed of the host vehicle, $v_q$ is a speed of the vehicle ahead, $a_s$ is a maximum brake acceleration of the host vehicle, $a_q$ is a maximum brake acceleration of the vehicle ahead, and $a_s$ and $a_q$ may be preset, for example, be both set to 3 m/s². For more safety, when the minimum safe distance is calculated, a reserved distance $L_0$ is added. The reserved distance $L_0$ may be set according to requirements. For example, it may be set that $L_0=10$ m.

Step 104B: Obtain a preset buffer parameter, and calculate a buffer distance according to the speed of the host vehicle and the buffer parameter.

Optionally, the buffer distance is a distance that is set for further ensuring safety of automated driving. The buffer distance is positively correlated to the speed of the host vehicle and the buffer parameter. The buffer parameter may be customized, for example, may be preset, be determined according to the speed of the host vehicle, or be determined according to a detected model of the vehicle ahead. In an embodiment, the buffer distance equals a product of the speed of the host vehicle and the buffer parameter.

Step 104C: Calculate the target vehicle-following distance according to the minimum safe distance and the buffer distance.

Optionally, to further ensure safety of automated driving, the minimum safe distance is added with a buffer distance to obtain target vehicle-following distance, that is, the target vehicle-following distance is set to the longer than the minimum safe distance, to sufficiently ensure safety of automated driving. In an embodiment, A calculation formula of the target vehicle-following distance is as follows: $L=L_S+v_s*k$, where L represents a target vehicle-following distance, $L_S$ represents a minimum safe distance, $v_s$ represents a speed of the host vehicle, k represents a buffer parameter, and $v_s*k$ represents a buffer distance, where k may be preset. For example, it may be set that k=1.

Figure 4:
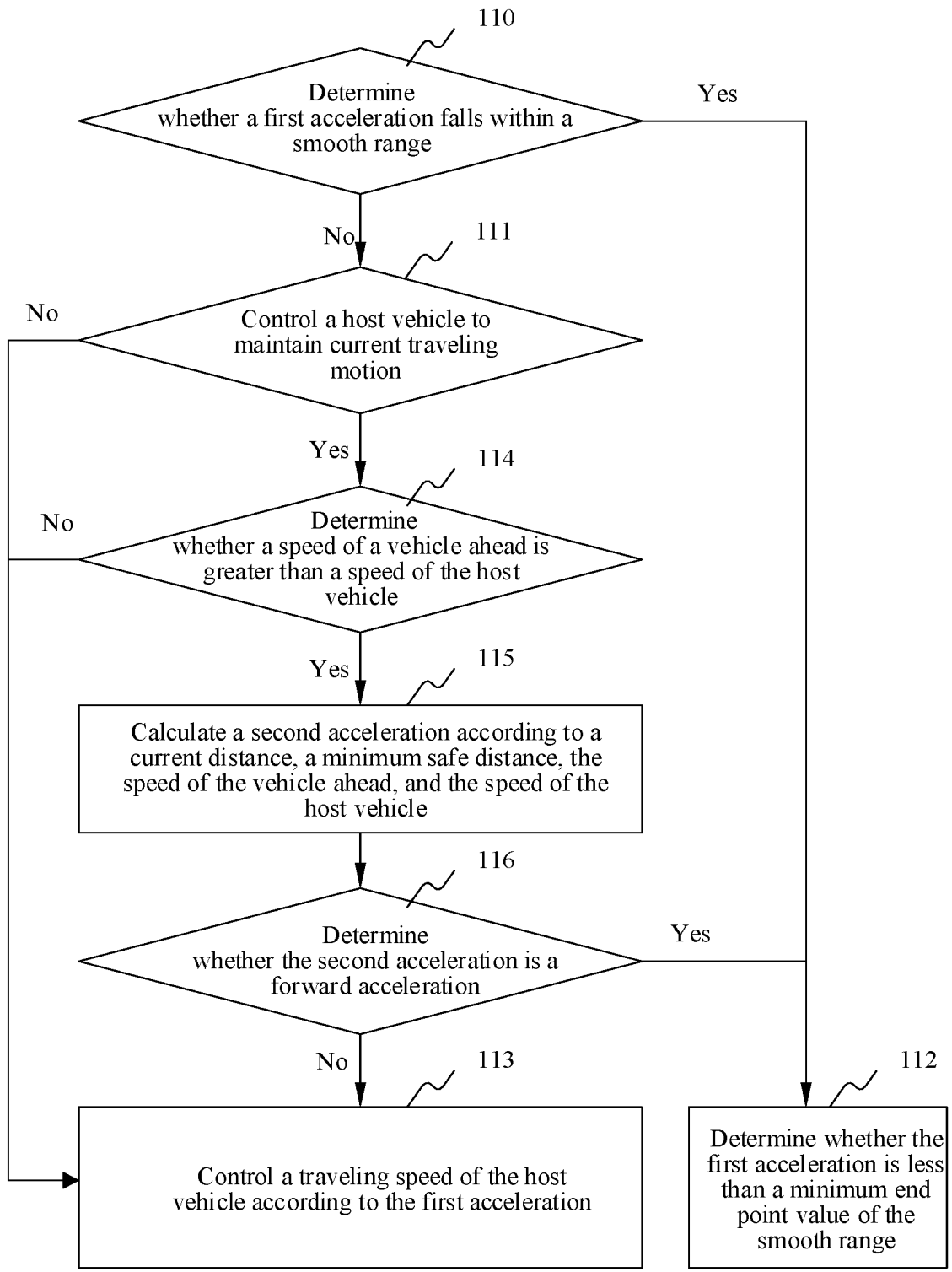
FIG. 4 is a method flowchart of controlling a traveling speed of a host vehicle in an embodiment.

As shown in FIG. 4, in an embodiment, the foregoing step 108 of obtaining a smooth range, determining a target acceleration according to the first acceleration and the smooth range, and controlling a traveling speed of the host vehicle according to the target acceleration includes the following steps.

Step 110: Determine whether the first acceleration falls within the smooth range, and if yes, perform step 111; otherwise, perform step 112.

Step 111: Control the host vehicle to maintain traveling at a current speed and/or acceleration.

Step 112: Determine whether the first acceleration is less than a minimum end point value of the smooth range, and if yes, perform step 114; otherwise, perform step 113.

Step 113: Control the traveling speed of the host vehicle according to the first acceleration.

Step 114: Determine whether the speed of the vehicle ahead is greater than the speed of the host vehicle, and if yes, perform step 115; otherwise, perform step 113.

Step 115: Calculate a second acceleration according to the current distance, the minimum safe distance, the speed of the vehicle ahead, and the speed of the host vehicle.

Step 116: Determine whether the second acceleration is a forward acceleration, and if yes, perform step 111; otherwise, perform step 113.

Optionally, first, whether the first acceleration falls within the smooth range is determined, and if yes, the host vehicle is controlled to maintain traveling at a current speed and/or acceleration; if not, it needs to continue to determine whether the first acceleration is less than a minimum end point value of the smooth range. If the first acceleration is not less than the minimum end point value, the traveling speed of the host vehicle is directly controlled by using the first acceleration. If the first acceleration is less than the minimum end point value, it needs to continue to determine whether the speed of the vehicle ahead is greater than speed of the host vehicle. If yes, the second acceleration is calculated according to the minimum safe distance, the current distance, the speed of the vehicle ahead, and the speed of the host vehicle. Subsequently, it also needs to determine whether the calculated second acceleration is a forward acceleration, that is, whether the second acceleration is greater than 0. If yes, the host vehicle is controlled to maintain traveling at a current speed and/or acceleration, and if not, the traveling speed of the host vehicle is controlled according to the first acceleration. For example, the smooth range is set to [−1, 0.5]. If the calculated first acceleration belongs to this range, the target acceleration is set to 0, and the host vehicle is controlled to maintain traveling at a current speed and/or acceleration, thereby avoiding frequent acceleration or deceleration, and improving comfort and stability. If the calculated first acceleration is less than −1, and the speed of the vehicle ahead is greater than the speed of the host vehicle, the minimum safe distance is used to calculate a second acceleration. If the second acceleration is greater than 0, the target acceleration is also set to 0. In this case, a distance between the vehicle ahead and the host vehicle is longer than the target vehicle-following distance, but is larger than the minimum safe distance, and if the speed of the vehicle ahead is relatively high, it does not need to brake, and the vehicle-following distance may be gradually restored. The method avoids frequent braking.

Figure 5:
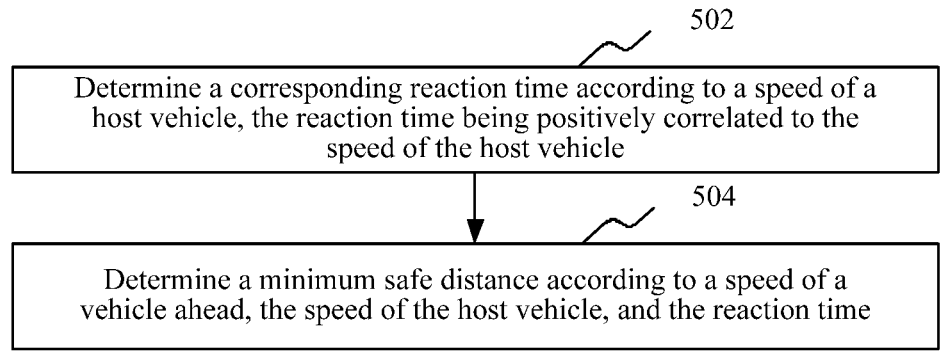
FIG. 5 is a method flowchart of determining a minimum safe distance in an embodiment.

As shown in FIG. 5, in an embodiment, step 104A of determining a minimum safe distance according to the speed of the vehicle ahead and the speed of the host vehicle includes the following steps.

Step 502: Determine a corresponding reaction time according to the speed of the host vehicle, the reaction time being positively correlated to the speed of the host vehicle.

The reaction time is brake reaction time, that is, a delay time for braking the host vehicle after detecting the vehicle ahead brakes or decelerates, since the vehicle will continue traveling according to an original state during the reaction time, a traveling distance during the period of time needs to be taken into consideration for the target vehicle-following distance. A conventional reaction time is usually a fixed value. To prevent a fixed reaction time from causing an excessive large vehicle-following distance at a low speed or an excessive small vehicle-following distance at a high speed, determining a reaction time according to the speed of the host vehicle is provided, where the reaction time is positively correlated to the speed of the host vehicle. That is, if a vehicle speed is higher, a reaction time is longer, so that safety is ensured better. In an embodiment, a speed value is preset, and a ratio of the speed of the host vehicle to the speed value is used as the reaction time. For example, if the speed value is set to 10 m/s, when the speed of the host vehicle is 7 m/s, a corresponding reaction time is 0.7 s. If the speed of the host vehicle is higher, a corresponding reaction time is longer.

Step 504: Determine the minimum safe distance according to the speed of the vehicle ahead, the speed of the host vehicle, and the reaction time.

Optionally, after the reaction time is calculated, the minimum safe distance is determined according to the speed of the vehicle ahead, the speed of the host vehicle, and the reaction time. The minimum safe distance is positively correlated to the reaction time, is positively correlated to the speed of the host vehicle, and is negatively correlated to the speed of the vehicle ahead. In an embodiment, The minimum safe distance may be calculated by using the following formula: $L_S = v_s t + (v_s - v_q) * k_1 + L_1$, where $L_S$ is a minimum safe distance, $t_s$ is a calculated reaction time, $v_s$ is a speed of the host vehicle, $v_q$ is a speed of the vehicle ahead, $L_1$ is a reserved standard distance, and $k_1$ is a preset coefficient (which, for example, is set to 0.5). In another embodiment, whether a difference between the speed of the vehicle ahead and the speed of the host vehicle is greater than a preset speed threshold is determined. If yes, it indicates that the speed of the vehicle ahead is much greater than the speed of the host vehicle, and in this case, it only needs to reserve a very short distance to avoid collision, so that the minimum safe distance may be directly set to a fixed value. If the difference between speed of the vehicle ahead and the speed of the host vehicle is not greater than the preset speed threshold, the minimum safe distance is calculated by using the foregoing formula.

In an embodiment, the step 502 of determining a corresponding reaction time according to the speed of the host vehicle, the reaction time being positively correlated to the speed of the host vehicle includes: determining, if the speed of the host vehicle is less than a preset speed value, a corresponding reaction time according to a ratio of the speed of the host vehicle to the preset speed value; and obtaining, if the speed of the host vehicle is not less than the preset speed value, a time coefficient, and determining a corresponding reaction time according to the speed of the host vehicle, the preset speed value, and the time coefficient.

Optionally, the reaction time is calculated by using a piecewise function. When the speed of the host vehicle is less than or equal to a preset speed value, the reaction time is determined according to a ratio of the speed of the host vehicle and the preset speed value. When the speed of the host vehicle is greater than the preset speed value, the reaction time is determined according to a difference between the speed of the host vehicle and the preset speed value and a time coefficient. The time coefficient may be preset to a fixed value, for example, 1 s, or may be adjusted according to the speed of the host vehicle. If the speed of the host vehicle is higher, a corresponding time coefficient is larger. In an embodiment, when the speed of the host vehicle is greater than the preset speed value, a difference between the speed of the host vehicle and the preset speed value multiplied by the time coefficient is used as a reaction time. That is, the reaction time is positively correlated to a difference between the speed of the host vehicle and the preset speed value, and is also positively correlated to the obtained time coefficient. In another embodiment, when the speed of the host vehicle is greater than the preset speed value, first, a reaction time when the speed of the host vehicle equals the preset speed value is used as a cardinal number, a product of a difference between the speed of the host vehicle and the preset speed value and a time coefficient is used as an added value, and a sum of the cardinal number and the added value is used as a final reaction time. Optionally, assuming that the preset speed value is $V_1$, if the speed of the host vehicle $v_s$ is less than $V_1$, the reaction time $t_s=v_s/V_1$, and if $v_s \geq V_1$, $t_s=1+(v_s-v_1)*h$, where h is a time coefficient, and a value of h may be customized. For example, it is set that h=0.05. A higher value of h indicates a fast increase of the reaction time.

Figure 6:
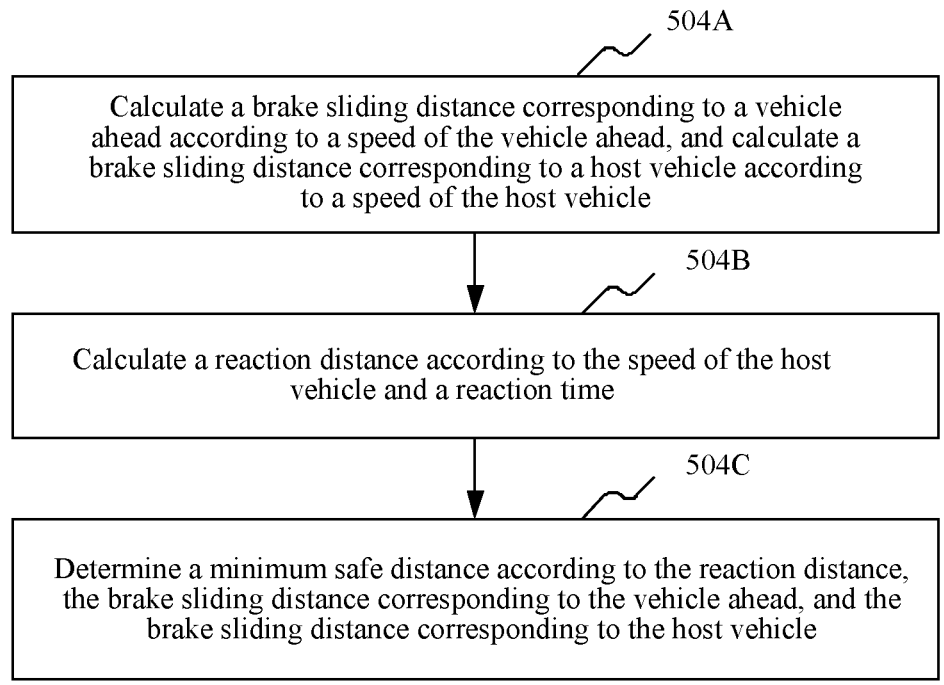
FIG. 6 is a method flowchart of determining a minimum safe distance in another embodiment.

As shown in FIG. 6, in an embodiment, step 504 of determining the minimum safe distance according to the speed of the vehicle ahead, the speed of the host vehicle, and the reaction time includes the following steps.

Step 504A: Calculate a brake sliding distance corresponding to the vehicle ahead according to the speed of the vehicle ahead, and calculate a brake sliding distance corresponding to the host vehicle according to the speed of the host vehicle.

The speed of the vehicle ahead is positively correlated to a brake sliding distance corresponding to the vehicle ahead. That is, a higher speed of the vehicle ahead indicates a longer brake sliding distance corresponding to the vehicle ahead. Likewise, the speed of the host vehicle is positively correlated to a brake sliding distance corresponding to the host vehicle. That is, a higher speed of the host vehicle indicates a longer brake sliding distance corresponding to the host vehicle. In an embodiment, a brake acceleration corresponding to the vehicle ahead and a brake acceleration corresponding to the host vehicle that are preset are obtained, a brake sliding distance corresponding to the vehicle ahead is calculated according to the speed of the vehicle ahead and the brake acceleration corresponding to the vehicle ahead, and a brake sliding distance corresponding to the host vehicle is calculated according to the speed of the host vehicle and the brake acceleration corresponding to the host vehicle.

Step 504B: Calculate a reaction distance according to the speed of the host vehicle and the reaction time.

The reaction distance is positively correlated to both the speed of the host vehicle and the reaction time. In an embodiment, a product of the speed of the host vehicle and the reaction time may be directly used as a reaction distance. In another embodiment, alternatively, a product of the speed of the host vehicle and the reaction time may be added with a distance to obtain a reaction distance.

Step 504C: Determine the minimum safe distance according to the reaction distance, the brake sliding distance corresponding to the vehicle ahead, and the brake sliding distance corresponding to the host vehicle.

The brake sliding distance is a distance by which a vehicle continues to slide due to inertia after braking. The minimum safe distance is positively correlated to both of the reaction distance and the brake sliding distance corresponding to the host vehicle, and the minimum safe distance is negatively correlated to the brake sliding distance corresponding to the vehicle ahead. In an embodiment, the brake sliding distance corresponding to the vehicle ahead is subtracted from a sum of the reaction distance and the brake sliding distance corresponding to the host vehicle to obtain the minimum safe distance. In another embodiment, for better safety, a reserved distance is further added, that is, the minimum safe distance=the reaction distance+the brake sliding distance corresponding to the host vehicle−the brake sliding distance corresponding to the vehicle ahead+the reserved distance. The reserved distance is specifically set for further ensuring safety. Optionally, the minimum safe distance may be calculated by using the following formula: $L_S=v_s t_s+v_s^2/2a_s-v_q^2/2a_q+L_0$, where $t_s$ is a reaction time, $L_S$ is a minimum safe distance, $v_s$ is a speed of the host vehicle, $v_q$ is a speed of the vehicle ahead, $a_s$ is a maximum brake acceleration of the host vehicle, $a_q$ is a maximum brake acceleration of the vehicle ahead, $a_s$ and $a_q$ may be preset, which, for example, may both be set to 3 m/s$^2$, and $L_0$ is a reserved distance, and may be customized. For example, it may be set that $L_0$=3 m.

In an embodiment, the step of calculating a brake sliding distance corresponding to the vehicle ahead according to the speed of the vehicle ahead, and calculating a brake sliding distance corresponding to the host vehicle according to the speed of the host vehicle includes: obtaining a first brake acceleration corresponding to the host vehicle and a second brake acceleration corresponding to the vehicle ahead; calculating the brake sliding distance corresponding to the host vehicle according to the speed of the host vehicle and the first brake acceleration; and calculating the brake sliding distance corresponding to the vehicle ahead according to the speed of the vehicle ahead and the second brake acceleration.

Optionally, the first brake acceleration is a maximum brake acceleration corresponding to the host vehicle. The second brake acceleration is a maximum brake acceleration corresponding to the vehicle ahead. The first brake acceleration may be obtained by obtaining a performance parameter of the host vehicle or may be customized in advance. For example, the first brake acceleration of the host vehicle is set to 3 m/s2. The second brake acceleration may be determined by detecting a model of the vehicle ahead, different models of vehicles and corresponding maximum brake accelerations are stored in advance, and a second brake acceleration corresponding to the vehicle ahead is determined according to the detected model of the vehicle ahead. In another embodiment, the second brake acceleration may alternatively automatically obtain performance parameter information of the vehicle ahead by establishing a connection to the vehicle ahead for communication, and determine a second brake acceleration corresponding to the vehicle ahead according to the performance parameter information.

Figure 7:
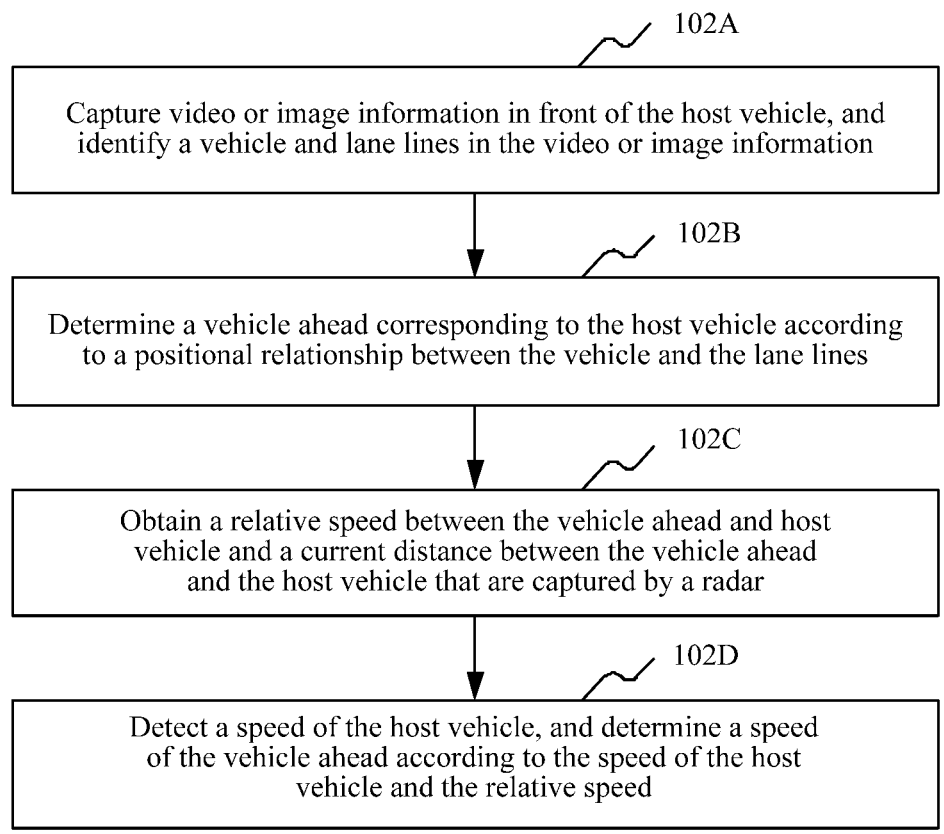
FIG. 7 is a method flowchart of obtaining a speed of a vehicle ahead, a speed of a host vehicle, and a current vehicle distance between the vehicle ahead and the host vehicle in an embodiment.

As shown in FIG. 7, in an embodiment, the step of obtaining a speed of a vehicle ahead, a speed of a host vehicle, and a current distance between the vehicle ahead and the host vehicle includes the following steps.

Step 102A: Capture video or image information in front of the host vehicle, and identify one or more vehicles and lane lines in the video or image information.

Figure 8A:
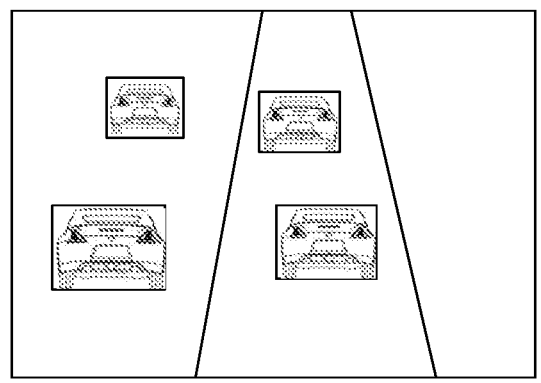
FIG. 8A is a schematic diagram of a vehicle and lane lines that are identified in an embodiment.

Video or image information in front of the host vehicle is captured by a camera in real time, and then, a vehicle and lane lines in the video or image information are identified by using an image feature identification algorithm. The image feature identification algorithm may be a monocular vision-based vehicle identification method, and certainly, may be another image feature identification algorithm. The image feature identification algorithm is not limited herein. As shown in FIG. 8A, FIG. 8A is a schematic diagram where a vehicle and lane lines are identified in an embodiment, where the identified vehicle is framed by using a corresponding rectangle. The vehicle ahead can be accurately determined by using the video or image information photographed by the camera, thereby avoiding accidental braking caused by selecting a vehicle ahead in an adjacent lane during cornering, and fully utilizing advantages of the camera.

Step 102B: Determine a vehicle ahead corresponding to the host vehicle according to positional relationships between the one or more vehicles and the lane lines.

Figure 8B:
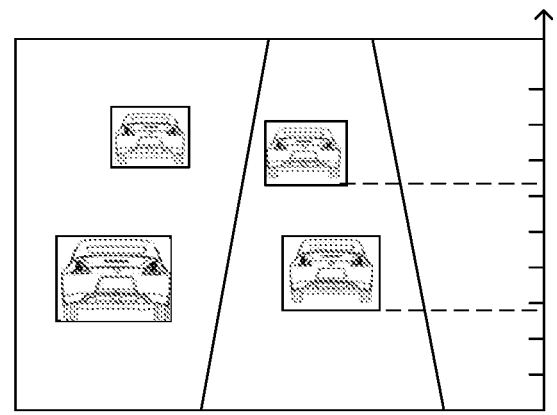
FIG. 8B is a schematic diagram of determining an area of a present lane according to left and right lane lines in an embodiment.

Optionally, after the vehicle and lane lines in the video or image information are identified, an area of the present lane in an image is determined according to left and right lane lines (corresponding to a middle portion between the left and right lane lines). An identified vehicle in the present lane is obtained, and then, a vehicle head corresponding to the host vehicle is determined according to a position of an outer surrounding rectangular frame corresponding to the identified vehicle. Optionally, first, vehicles of vehicle outer surrounding rectangular frames inside the area of the present lane are selected, and then, are ranked according to coordinates of middle points on lower frame edges, that is, vertical coordinates of the lower frame edges of the rectangular frames (as shown in FIG. 8B), and a vehicle having a lowest coordinate position is found as the vehicle ahead.

Step 102C: Obtain a relative speed between the vehicle ahead and host vehicle and a current distance between the vehicle ahead and the host vehicle that are captured by a radar.

After the vehicle ahead is identified and determined in the video or image information, a relative speed between the vehicle ahead and the host vehicle and a current distance between the vehicle ahead and the host vehicle that are captured by a radar are obtained. Optionally, the radar is responsible for detecting a distance and a relative speed between the vehicle ahead and the host vehicle. Because a detection scope of a radar is relatively large, usually a plurality of vehicles in front is detected, and relative speeds between the plurality of vehicles in front and the host vehicle are obtained by using the radar. Therefore, to learn which piece of data is a relative speed and distance corresponding to the vehicle ahead, it needs to match the collected data of the vehicle ahead with the vehicle ahead in the video or image information to determine a relative speed between the vehicle ahead and the host vehicle and the current distance between the vehicle ahead and the host vehicle. A matching algorithm may be a method for detecting a vehicle ahead by integrating a millimeter wave radar with machine vision information, that is, projecting a point target captured by the radar onto an image, generating an area of interest around the point target, then only searching the area, after finding the point by searching, matching the point with the point target of the radar, and if the point successfully matches the point target, indicating that the point is a point corresponding to the vehicle ahead, obtaining a distance and a relative speed corresponding to the point.

Step 102D: Detect a speed of the host vehicle, and determine the speed of the vehicle ahead according to the speed of the host vehicle and the relative speed.

The speed of the host vehicle may be detected by using the vehicle information capturing apparatus in the host vehicle. On the premise that the relative speed between the vehicle ahead and the host vehicle is known, a speed of the vehicle ahead corresponding to the vehicle ahead is calculated according to the speed of the host vehicle. In the foregoing process, the image and the data collected by the radar are integrated, to accurately determine the vehicle ahead and the relative speed and distance between the vehicle ahead and the host vehicle, thereby avoiding accidental braking caused by selecting a vehicle ahead in an adjacent lane during cornering.

Figure 9:
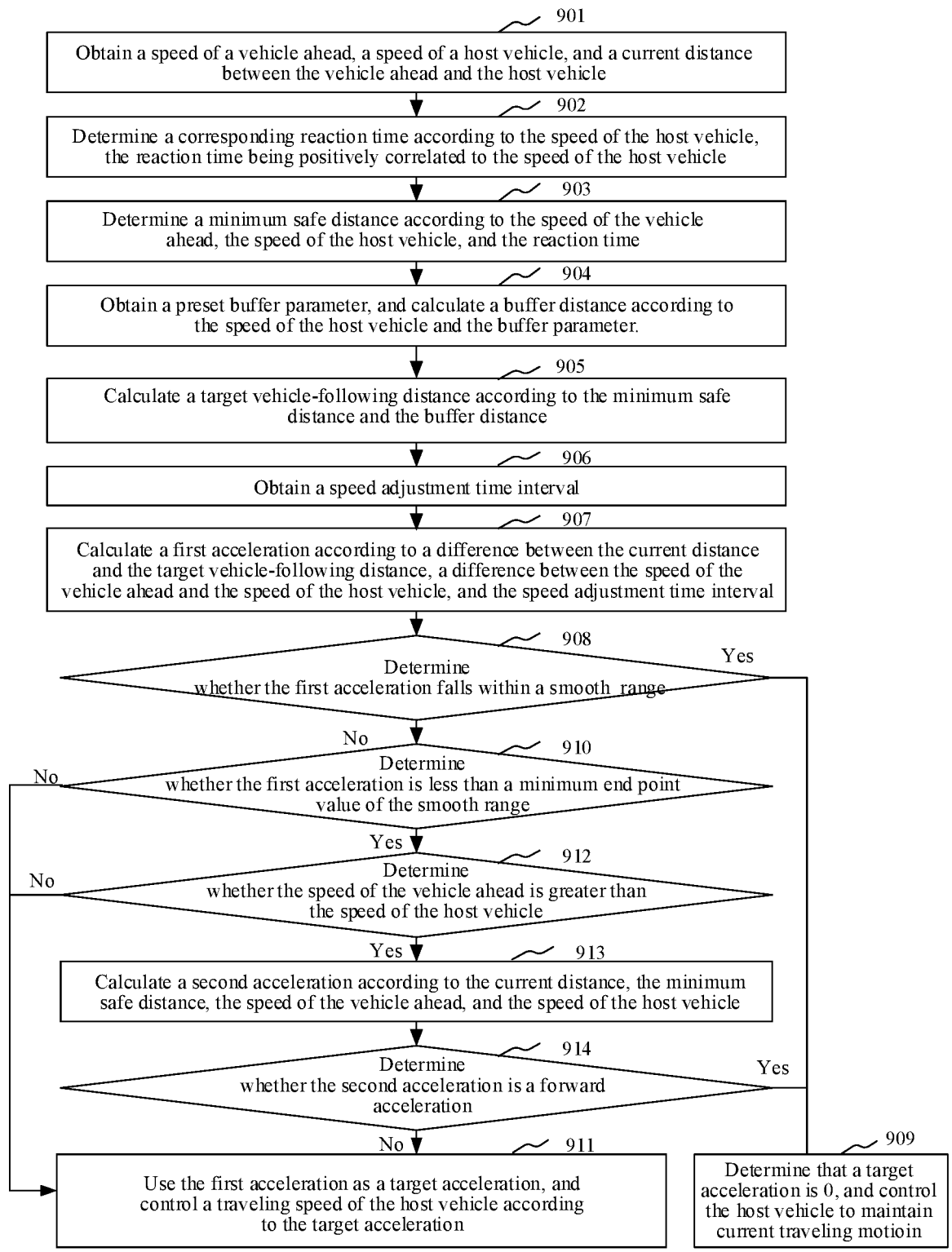
FIG. 9 is a flowchart of a vehicle-following speed control method in another embodiment.

As shown in FIG. 9, in an embodiment, a vehicle-following speed control method is provided. The method includes:

Step 901: Obtain a speed of a vehicle ahead, a speed of a host vehicle, and a current distance between the vehicle ahead and the host vehicle.

Step 902: Determine a corresponding reaction time according to the speed of the host vehicle, the reaction time being positively correlated to the speed of the host vehicle.

Step 903: Determine a minimum safe distance according to the speed of the vehicle ahead, the speed of the host vehicle, and the reaction time.

Step 904: Obtain a preset buffer parameter, and calculate a buffer distance according to the speed of the host vehicle and the buffer parameter.

Step 905: Calculate a target vehicle-following distance according to the minimum safe distance and the buffer distance.

Step 906: Obtain a speed adjustment time interval.

Step 907: Calculate a first acceleration according to a difference between the current distance and the target vehicle-following distance, a difference between the speed of the vehicle ahead and the speed of the host vehicle, and the speed adjustment time interval.

Step 908: Determine whether the first acceleration falls within a smooth-travel acceleration range, and if yes, perform step 909; otherwise, perform step 910.

Step 909: Determine that a target acceleration is 0, and control the host vehicle to maintain traveling at a current speed and/or acceleration.

Step 910: Determine whether the first acceleration is less than a minimum end point value of the smooth range, and if yes, perform step 912; otherwise, perform step 911.

Step 911: Use the first acceleration as a target acceleration, and control a traveling speed of the host vehicle according to the target acceleration.

Step 912: Determine whether the speed of the vehicle ahead is greater than the speed of the host vehicle, and if yes, perform step 913; otherwise, perform step 911.

Step 913: Calculate a second acceleration according to the current distance, the minimum safe distance, the speed of the vehicle ahead, and the speed of the host vehicle.

Step 914: Determine whether the second acceleration is a forward acceleration, and if yes, perform step 909; otherwise, perform step 911.

Figure 10:
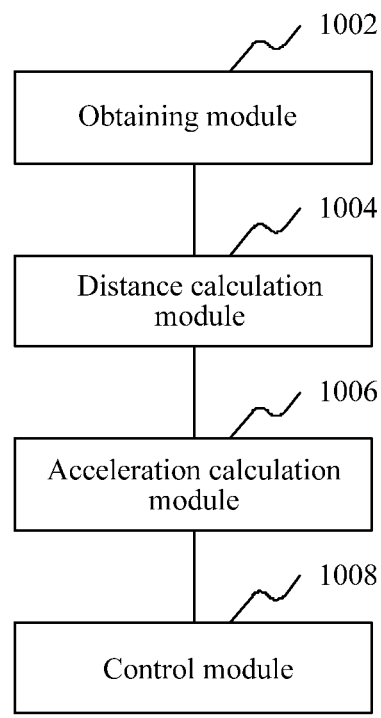
FIG. 10 is a structural block diagram of a vehicle-following speed control apparatus in an embodiment.

As shown in FIG. 10, in an embodiment, a vehicle-following speed control apparatus is provided. The apparatus includes:

an obtaining module 1002, configured to obtain a speed of a vehicle ahead, a speed of a host vehicle, and a current distance between the vehicle ahead and the host vehicle;

a distance calculation module 1004, configured to calculate a corresponding target vehicle-following distance according to the speed of the vehicle ahead and the speed of the host vehicle;

an acceleration calculation module 1006, configured to calculate a first acceleration according to the current distance, the target vehicle-following distance, the speed of the vehicle ahead, and the speed of the host vehicle; and a control module 1008, configured to obtain a smooth range, determine a target acceleration according to the first acceleration and the smooth range, and control a traveling speed of the host vehicle according to the target acceleration.

In an embodiment, the smooth range is a smooth-travel acceleration range, and the control module is further configured to determine, if the first acceleration falls within the smooth-travel acceleration range, that the target acceleration is 0, and control the host vehicle to maintain traveling at a current speed and/or acceleration.

In an embodiment, the acceleration calculation module 1006 is further configured to obtain a speed adjustment time interval; and calculate the first acceleration according to a difference between the current distance and the target vehicle-following distance, a difference between the speed of the vehicle ahead and the speed of the host vehicle, and the speed adjustment time interval.

In an embodiment, the foregoing vehicle-following speed control apparatus further includes: a first acceleration determining module, configured to: use, if the calculated first acceleration is greater than a preset first threshold, the first threshold as the first acceleration; and use, if the calculated first acceleration less than a preset second threshold, the second threshold as the first acceleration.

Figure 11:
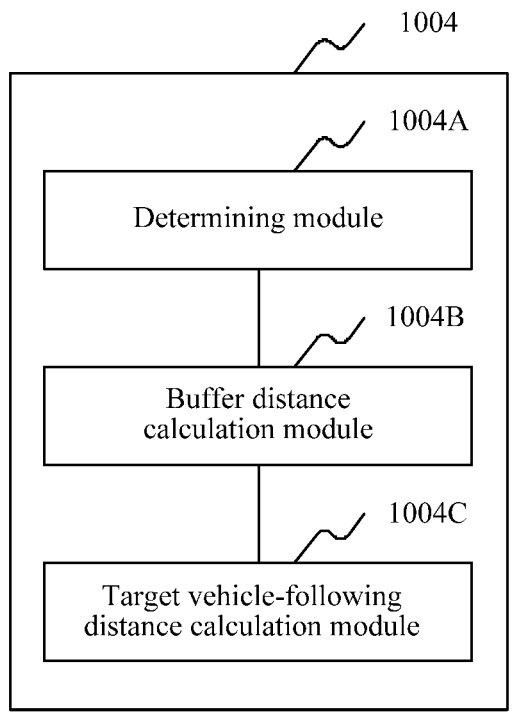
FIG. 11 is a structural block diagram of a vehicle-following speed control apparatus in another embodiment.

As shown in FIG. 11, in an embodiment, the distance calculation module 1004 includes:

a determining module 1004A, configured to determine a minimum safe distance according to the speed of the vehicle ahead and the speed of the host vehicle;

a buffer distance calculation module 1004B, configured to obtain a preset buffer parameter, and calculate a buffer distance according to the speed of the host vehicle and the buffer parameter; and a target vehicle-following distance calculation module 1004C, configured to calculate the target vehicle-following distance according to the minimum safe distance and the buffer distance.

In an embodiment, the control module 1008 is further configured to: calculate, when the first acceleration does not fall within the smooth range, if the first acceleration is less than a minimum end point value of the smooth range and the speed of the vehicle ahead is greater than the speed of the host vehicle, a second acceleration according to the current distance, the minimum safe distance, the speed of the vehicle ahead, and the speed of the host vehicle; and determine, if the second acceleration is a forward acceleration, that the target acceleration is 0, and control the host vehicle to maintain traveling at a current speed and/or acceleration.

Figure 12:
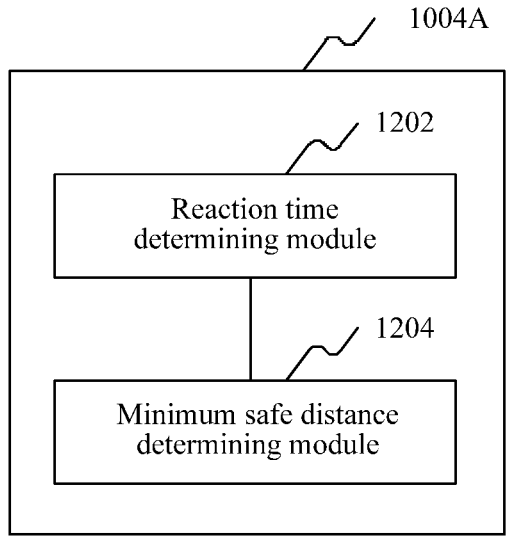
FIG. 12 is a structural block diagram of a safe distance determining module according to an embodiment.

As shown in FIG. 12, in an embodiment, the safe distance determining module 1004A includes:

a reaction time determining module 1202, configured to determine a corresponding reaction time according to the speed of the host vehicle, the reaction time being positively correlated to the speed of the host vehicle; and a minimum safe distance determining module 1204, configured to determine the minimum safe distance according to the speed of the vehicle ahead, the speed of the host vehicle, and the reaction time.

In an embodiment, the reaction time determining module 1202 is further configured to determine, if the speed of the host vehicle is less than a preset speed value, a corresponding reaction time according to a ratio of the speed of the host vehicle to the preset speed value; and obtain, if the speed of the host vehicle is not less than the preset speed value, a time coefficient, and determine a corresponding reaction time according to the speed of the host vehicle, the preset speed value, and the time coefficient.

Figure 13:
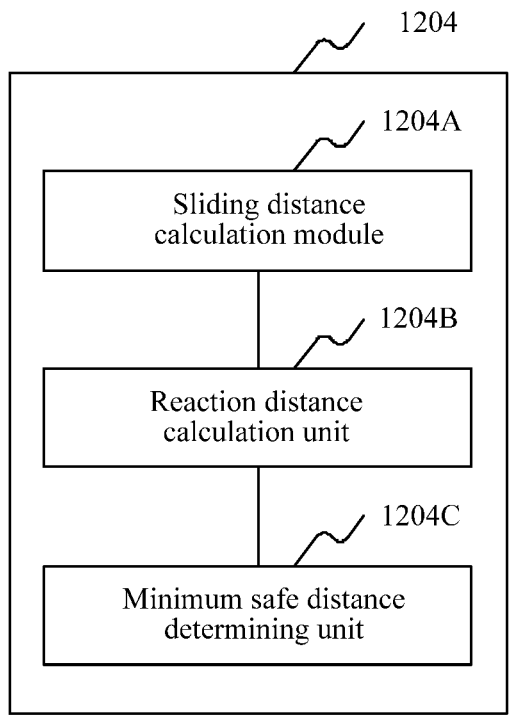
FIG. 13 is a structural block diagram of a minimum safe distance determining module according to an embodiment.

As shown in FIG. 13, in an embodiment, the minimum safe distance determining module 1204 includes:

a sliding distance calculation module 1204A, configured to calculate a brake sliding distance corresponding to the vehicle ahead according to the speed of the vehicle ahead, and calculate a brake sliding distance corresponding to the host vehicle according to the speed of the host vehicle;

a reaction distance calculation unit 1204B, configured to calculate a reaction distance according to the speed of the host vehicle and the reaction time; and a minimum safe distance determining unit 1204C, configured to determine determining the minimum safe distance according to the reaction distance, the brake sliding distance corresponding to the vehicle ahead, and the brake sliding distance corresponding to the host vehicle.

In an embodiment, the sliding distance calculation unit 1204A is further configured to obtain a preset first brake acceleration corresponding to the host vehicle and a preset second brake acceleration corresponding to the vehicle ahead; calculate the brake sliding distance corresponding to the host vehicle according to the speed of the host vehicle and the first brake acceleration; and calculate the brake sliding distance corresponding to the vehicle ahead according to the speed of the vehicle ahead and the second brake acceleration.

In an embodiment, the obtaining module 1002 is further configured to capture video or image information in front of the host vehicle, and identify a vehicle and lane lines in the video or image information; determine a vehicle ahead corresponding to the host vehicle according to a positional relationship between the vehicle and the lane lines; obtain a relative speed between the vehicle ahead and host vehicle and a current distance between the vehicle ahead and the host vehicle that are captured by a radar; and detect a speed of the host vehicle, and determining the speed of the vehicle ahead according to the speed of the host vehicle and the relative speed.

Figure 14:
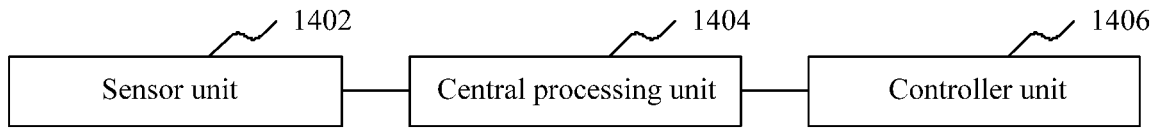
FIG. 14 is a structural block diagram of a vehicle-following speed control system in an embodiment.

As shown in FIG. 14, in an embodiment, a vehicle-following speed control system is provided, including:

a sensor unit 1402, configured to capture a speed of a host vehicle, a relative speed between a vehicle ahead and the host vehicle, and a current distance between the vehicle ahead and the host vehicle.

Optionally, the sensor unit includes a vehicle speed sensor and a radar. The vehicle speed sensor is configured to capture the speed of the host vehicle, and the radar is configured to capture the relative speed between the vehicle ahead and the host vehicle and the current distance between the vehicle ahead and the host vehicle.

A central processing unit 1404 includes the vehicle-following speed control apparatus in any one of the foregoing embodiments and configured to determine a target acceleration according to the vehicle-following speed control apparatus, and send the determined target acceleration to a controller unit.

Optionally, the central processing unit includes the vehicle-following speed control apparatus in any of the foregoing embodiments. The vehicle-following speed control apparatus is configured to obtain the speed of the host vehicle, the relative speed between the vehicle ahead and the host vehicle, and the current distance between the vehicle ahead and the host vehicle that are captured by the sensor unit, then, calculate the target acceleration, and send the calculated target acceleration to the controller unit.

The controller unit 1406 is configured to control a traveling speed of the host vehicle according to the target acceleration.

Optionally, the controller unit is configured to receive the target acceleration sent by the central processing unit, and control a throttle or a brake system according to the target acceleration to control a traveling speed of the host vehicle.

Figure 15:
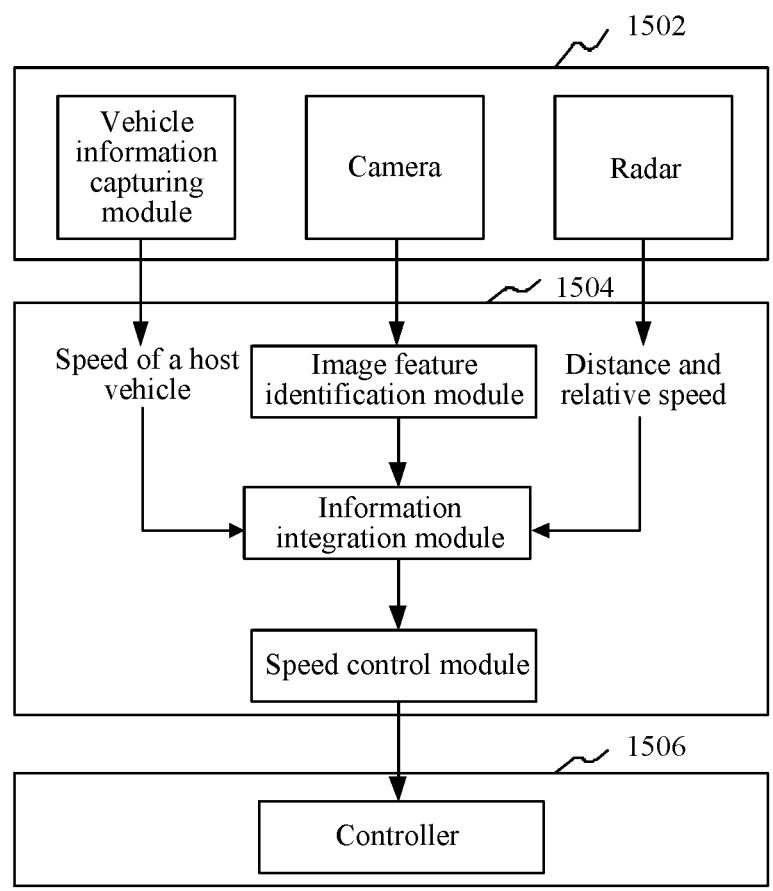
FIG. 15 is a schematic structural diagram of a vehicle-following speed control system in an embodiment.

As shown in FIG. 15, in an embodiment, a vehicle-following speed control system is provided. The system includes: a sensor unit 1502, a central processing unit 1504, and a controller unit 1506. The sensor unit 1502 includes a camera, a radar, and a vehicle information capturing apparatus. Optionally, video or image information in front is captured by using the camera. A distance and a relative speed between a vehicle ahead and a host vehicle are detected by using the radar, and a speed of the host vehicle is measured by using the vehicle information capturing apparatus (for example, a vehicle sensor). The central processing unit 904 includes an image feature identification module, an information integration module, and a Speed control module. The image feature identification module is configured to identify a vehicle and lane lines in video or image information according to an image feature identification algorithm, and determine a vehicle ahead according to a positional relationship between the vehicle and the lane lines. The information integration module is configured to match data of the vehicle ahead in the video or image with the data of the vehicle ahead identified by the radar, obtain a distance and a relative speed corresponding to the vehicle ahead, and determine a speed of the vehicle ahead according to speed of the host vehicle and the relative speed between the vehicle ahead and the host vehicle. The Speed control module in the central processing unit determines a target acceleration that is needed during vehicle-following of the host vehicle according to the speed of the host vehicle, the speed of the vehicle ahead, and the distance between the vehicle ahead and the host vehicle, and sends the target acceleration to the controller unit. The controller controls a throttle and a brake system according to the target acceleration to control a traveling speed of the vehicle. In the method, control logic is placed in the Speed control module. Compared with a conventional manner of integrating the control logic into the controller, the method may implement a complex control policy, and meanwhile, can adjust the control policy more flexibly.

Figure 16:
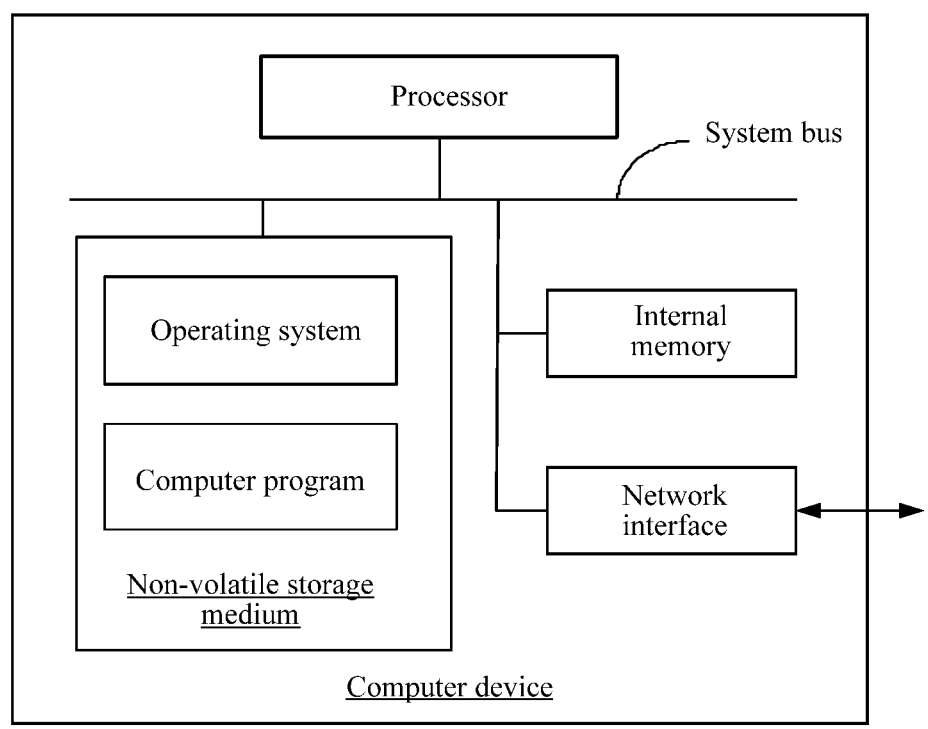
FIG. 16 is a schematic diagram of an inner structure of a computer device in an embodiment.

FIG. 16 is a schematic diagram of an inner structure of a computer device in an embodiment. The computer device may be a terminal. The terminal may be an electronic device having a communication function such as a smartphone, a tablet computer, a notebook computer, a desktop computer, a personal digital assistant, a wearable device, and an on-vehicle device. Referring to FIG. 16, the electronic device includes a processor, a non-volatile storage medium, an internal memory, and a network interface that are connected through a system bus. The non-volatile storage medium of the computer device may store an operating system and a computer program. The computer program, when executed, may cause the processor to perform a vehicle-following speed control method. The processor of the computer device is configured to provide calculation and control capabilities, to support running of the entire computer device. The internal memory may store the computer program. When executed by the processor, the computer program may cause the processor to perform a vehicle-following speed control method. The network interface of the computer device is configured to perform network communication. A person skilled in the art may understand that, the structure shown in FIG. 16 is merely a block diagram of a partial structure related to the solutions of this application, and does not constitute a limitation to the computer device to which the solutions of this application are applied, and an optional computer device may include more or fewer components than those shown in the figure, or some components may be combined, or a different component deployment may be used.

In an embodiment, the vehicle-following speed control apparatus provided by this application may be implemented in a form of a computer program. The computer program may run on the computer device shown FIG. 16, and the non-volatile storage medium of the computer device may store respective program modules constituting the vehicle-following speed control apparatus, for example, the obtaining module 1002, the distance calculation module 1004, the acceleration calculation module 1006, and the control module 1008, as shown in FIG. 10. Each program module includes a computer program. The computer program is used to enable the computer device to perform a step in the vehicle-following speed control method in each embodiment of this application described in this specification. The processor in the computer device can invoke each program module of the vehicle-following speed control apparatus stored in the non-volatile storage medium of the computer, run corresponding, and implement a function corresponding to each module of the vehicle-following speed control apparatus in this specification. For example, the computer device may obtain a speed of a vehicle ahead, a speed of a host vehicle, and a current distance between the vehicle ahead and the host vehicle by using the obtaining module 1002 in the vehicle-following speed control apparatus shown in FIG. 10; calculate a corresponding target vehicle-following distance according to the speed of the vehicle ahead and the speed of the host vehicle by using the distance calculation module 1004; calculate a first acceleration according to the current distance, the target vehicle-following distance, the speed of the vehicle ahead, and the speed of the host vehicle by using the acceleration calculation module 1006; and obtain a smooth range, determine a target acceleration according to the first acceleration and the smooth range, and control a traveling speed of the host vehicle according to the target acceleration by using the control module 1008.

In an embodiment, a computer device is provided, including: a memory and a processor, the memory storing a computer program, and the computer program, when executed by the processor, causing the processor to execute the computer program to perform the following steps: obtaining a speed of a vehicle ahead, a speed of a host vehicle, and a current distance between the vehicle ahead and the host vehicle; calculating a corresponding target vehicle-following distance according to the speed of the vehicle ahead and the speed of the host vehicle; calculating a first acceleration according to the current distance, the target vehicle-following distance, the speed of the vehicle ahead, and the speed of the host vehicle; and obtaining a smooth range, determining a target acceleration according to the first acceleration and the smooth range, and controlling a traveling speed of the host vehicle according to the target acceleration.

In an embodiment, the smooth range is a smooth-travel acceleration range, and step 108 of obtaining a smooth range, determining a target acceleration according to the first acceleration and the smooth range, and controlling a traveling speed of the host vehicle according to the target acceleration includes: determining that the target acceleration is 0, and controlling the host vehicle to maintain traveling at a current speed and/or acceleration when the first acceleration falls within the smooth-travel acceleration range.

In an embodiment, the step of calculating a first acceleration according to the current distance, the target vehicle-following distance, the speed of the vehicle ahead, and the speed of the host vehicle includes: obtaining a speed adjustment time interval; and calculating the first acceleration according to a difference between the current distance and the target vehicle-following distance, a difference between the speed of the vehicle ahead and the speed of the host vehicle, and the speed adjustment time interval.

In an embodiment, the computer program, when executed by the processor, is further used to perform the following steps: using, if the calculated first acceleration is greater than a preset first threshold, the first threshold as the first acceleration; and using, if the calculated first acceleration less than a preset second threshold, the second threshold as the first acceleration.

In an embodiment, the step of calculating a corresponding target vehicle-following distance according to the speed of the vehicle ahead and the speed of the host vehicle includes: determining a minimum safe distance according to the speed of the vehicle ahead and the speed of the host vehicle; obtaining a preset buffer parameter, and calculating a buffer distance according to the speed of the host vehicle and the buffer parameter; and calculating the target vehicle-following distance according to the minimum safe distance and the buffer distance.

In an embodiment, the step of obtaining a smooth range, determining a target acceleration according to the first acceleration and the smooth range, and controlling a traveling speed of the host vehicle according to the target acceleration includes: calculating, when the first acceleration does not fall within the smooth range, if the first acceleration is less than a minimum end point value of the smooth range and the speed of the vehicle ahead is greater than the speed of the host vehicle, a second acceleration according to the current distance, the minimum safe distance, the speed of the vehicle ahead, and the speed of the host vehicle; and determining, if the second acceleration is a forward acceleration, that the target acceleration is 0, and controlling the host vehicle to maintain traveling at a current speed and/or acceleration.

In an embodiment, the step of determining a minimum safe distance according to the speed of the vehicle ahead and the speed of the host vehicle includes: determining a corresponding reaction time according to the speed of the host vehicle, the reaction time being positively correlated to the speed of the host vehicle; and determining the minimum safe distance according to the speed of the vehicle ahead, the speed of the host vehicle, and the reaction time.

In an embodiment, the step of determining a corresponding reaction time according to the speed of the host vehicle, the reaction time being positively correlated to the speed of the host vehicle includes: determining, if the speed of the host vehicle is less than a preset speed value, a corresponding reaction time according to a ratio of the speed of the host vehicle to the preset speed value; and obtaining, if the speed of the host vehicle is not less than the preset speed value, a time coefficient, and determining a corresponding reaction time according to the speed of the host vehicle, the preset speed value, and the time coefficient.

In an embodiment, the determining the minimum safe distance according to the speed of the vehicle ahead, the speed of the host vehicle, and the reaction time includes: calculating a brake sliding distance corresponding to the vehicle ahead according to the speed of the vehicle ahead, and calculating a brake sliding distance corresponding to the host vehicle according to the speed of the host vehicle; calculating a reaction distance according to the speed of the host vehicle and the reaction time; and determining the minimum safe distance according to the reaction distance, the brake sliding distance corresponding to the vehicle ahead, and the brake sliding distance corresponding to the host vehicle.

In an embodiment, the step of calculating a brake sliding distance corresponding to the vehicle ahead according to the speed of the vehicle ahead, and calculating a brake sliding distance corresponding to the host vehicle according to the speed of the host vehicle includes: obtaining a preset first brake acceleration corresponding to the host vehicle and a preset second brake acceleration corresponding to the vehicle ahead; calculating the brake sliding distance corresponding to the host vehicle according to the speed of the host vehicle and the first brake acceleration; and calculating the brake sliding distance corresponding to the vehicle ahead according to the speed of the vehicle ahead and the second brake acceleration.

In an embodiment, the step of obtaining a speed of a vehicle ahead, a speed of a host vehicle, and a current distance between the vehicle ahead and the host vehicle includes: capturing video or image information in front of the host vehicle, and identifying a vehicle and lane lines in the video or image information; determining a vehicle ahead corresponding to the host vehicle according to a positional relationship between the vehicle and the lane lines; obtaining a relative speed between the vehicle ahead and host vehicle and a current distance between the vehicle ahead and the host vehicle that are captured by a radar; and detecting a speed of the host vehicle, and determining the speed of the vehicle ahead according to the speed of the host vehicle and the relative speed.

A computer-readable storage medium is provided, storing a computer program, the computer program, when executed by a processor, performing the following steps: obtaining a speed of a vehicle ahead, a speed of a host vehicle, and a current distance between the vehicle ahead and the host vehicle; calculating a corresponding target vehicle-following distance according to the speed of the vehicle ahead and the speed of the host vehicle; calculating a first acceleration according to the current distance, the target vehicle-following distance, the speed of the vehicle ahead, and the speed of the host vehicle; and obtaining a smooth range, determining a target acceleration according to the first acceleration and the smooth range, and controlling a traveling speed of the host vehicle according to the target acceleration.

In an embodiment, the smooth range is a smooth-travel acceleration range, and step 108 of obtaining a smooth range, determining a target acceleration according to the first acceleration and the smooth range, and controlling a traveling speed of the host vehicle according to the target acceleration includes: determining that the target acceleration is 0, and controlling the host vehicle to maintain traveling at a current speed and/or acceleration when the first acceleration falls within the smooth-travel acceleration range.

In an embodiment, the step of calculating a first acceleration according to the current distance, the target vehicle-following distance, the speed of the vehicle ahead, and the speed of the host vehicle includes: obtaining a speed adjustment time interval; and calculating the first acceleration according to a difference between the current distance and the target vehicle-following distance, a difference between the speed of the vehicle ahead and the speed of the host vehicle, and the speed adjustment time interval.

In an embodiment, the computer program, when executed by the processor, is further used to perform the following steps: using, if the calculated first acceleration is greater than a preset first threshold, the first threshold as the first acceleration; and using, if the calculated first acceleration less than a preset second threshold, the second threshold as the first acceleration.

In an embodiment, the step of calculating a corresponding target vehicle-following distance according to the speed of the vehicle ahead and the speed of the host vehicle includes: determining a minimum safe distance according to the speed of the vehicle ahead and the speed of the host vehicle; obtaining a preset buffer parameter, and calculating a buffer distance according to the speed of the host vehicle and the buffer parameter; and calculating the target vehicle-following distance according to the minimum safe distance and the buffer distance.

In an embodiment, the step of obtaining a smooth range, determining a target acceleration according to the first acceleration and the smooth range, and controlling a traveling speed of the host vehicle according to the target acceleration includes: calculating, when the first acceleration does not fall within the smooth range, if the first acceleration is less than a minimum end point value of the smooth range and the speed of the vehicle ahead is greater than the speed of the host vehicle, a second acceleration according to the current distance, the minimum safe distance, the speed of the vehicle ahead, and the speed of the host vehicle; and determining, if the second acceleration is a forward acceleration, that the target acceleration is 0, and controlling the host vehicle to maintain traveling at a current speed and/or acceleration.

In an embodiment, the step of determining a minimum safe distance according to the speed of the vehicle ahead and the speed of the host vehicle includes: determining a corresponding reaction time according to the speed of the host vehicle, the reaction time being positively correlated to the speed of the host vehicle; and determining the minimum safe distance according to the speed of the vehicle ahead, the speed of the host vehicle, and the reaction time.

In an embodiment, the step of determining a corresponding reaction time according to the speed of the host vehicle, the reaction time being positively correlated to the speed of the host vehicle includes: determining, if the speed of the host vehicle is less than a preset speed value, a corresponding reaction time according to a ratio of the speed of the host vehicle to the preset speed value; and obtaining, if the speed of the host vehicle is not less than the preset speed value, a time coefficient, and determining a corresponding reaction time according to the speed of the host vehicle, the preset speed value, and the time coefficient.

In an embodiment, the determining the minimum safe distance according to the speed of the vehicle ahead, the speed of the host vehicle, and the reaction time includes: calculating a brake sliding distance corresponding to the vehicle ahead according to the speed of the vehicle ahead, and calculating a brake sliding distance corresponding to the host vehicle according to the speed of the host vehicle; calculating a reaction distance according to the speed of the host vehicle and the reaction time; and determining the minimum safe distance according to the reaction distance, the brake sliding distance corresponding to the vehicle ahead, and the brake sliding distance corresponding to the host vehicle.

In an embodiment, the step of calculating a brake sliding distance corresponding to the vehicle ahead according to the speed of the vehicle ahead, and calculating a brake sliding distance corresponding to the host vehicle according to the speed of the host vehicle includes: obtaining a preset first brake acceleration corresponding to the host vehicle and a preset second brake acceleration corresponding to the vehicle ahead; calculating the brake sliding distance corresponding to the host vehicle according to the speed of the host vehicle and the first brake acceleration; and calculating the brake sliding distance corresponding to the vehicle ahead according to the speed of the vehicle ahead and the second brake acceleration.

In an embodiment, the step of obtaining a speed of a vehicle ahead, a speed of a host vehicle, and a current distance between the vehicle ahead and the host vehicle includes: capturing video or image information in front of the host vehicle, and identifying a vehicle and lane lines in the video or image information; determining a vehicle ahead corresponding to the host vehicle according to a positional relationship between the vehicle and the lane lines; obtaining a relative speed between the vehicle ahead and host vehicle and a current distance between the vehicle ahead and the host vehicle that are captured by a radar; and detecting a speed of the host vehicle, and determining the speed of the vehicle ahead according to the speed of the host vehicle and the relative speed.

A person of ordinary skill in the art should understand that all or a part of the steps of the method according to the foregoing embodiments may be implemented by a computer program instructing relevant hardware. The computer program may be stored in a computer-readable storage medium. When the program is executed, the steps of the embodiments of the method may be included. The storage medium may be a non-volatile storage medium such as a magnetic disk, an optical disc, or a read-only memory (ROM), or may be a random access memory (RAM) or the like.

The foregoing embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A vehicle-following speed control method, comprising:
   obtaining a speed of a host vehicle, a speed of a vehicle ahead of the host vehicle, and a current distance between the vehicle ahead and the host vehicle;
   determining a reaction time according to the speed of the host vehicle, the reaction time being positively correlated to the speed of the host vehicle;
   determining a minimum safe distance according to the speed of the vehicle ahead, the speed of the host vehicle, and the reaction time;
   calculating a buffer distance according to the speed of the host vehicle and a buffer Parameter;
   calculating a target vehicle-following distance according to the minimum safe distance and the buffer distance;
   calculating a first acceleration according to the current distance, the target vehicle-following distance, the speed of the vehicle ahead, and the speed of the host vehicle;
   determining a target acceleration according to the first acceleration and a smooth-travel requirement; and
   controlling the host vehicle to travel according to the target acceleration.

2. The method according to claim 1, wherein the smooth-travel requirement includes a smooth-travel acceleration range, and controlling the speed of the host vehicle according to the target acceleration comprises:
   determining that the target acceleration is 0, and controlling the host vehicle to maintain current traveling motion when the first acceleration falls within the smooth-travel acceleration range.

3. The method according to claim 1, wherein calculating the first acceleration according to the current distance, the target vehicle-following distance, the speed of the vehicle ahead, and the speed of the host vehicle comprises:
  obtaining a speed adjustment time interval; and
  calculating the first acceleration according to a difference between the current distance and the target vehicle-following distance, a difference between the speed of the vehicle ahead and the speed of the host vehicle, and the speed adjustment time interval.

4. The method according to claim 1, further comprising:
  using, if the calculated first acceleration is greater than a preset first threshold, the first threshold as the first acceleration; and
  using, if the calculated first acceleration less than a preset second threshold, the second threshold as the first acceleration.

5. The method according to claim 1, wherein the smooth-travel requirement includes a smooth-travel acceleration range, and controlling the speed of the host vehicle according to the target acceleration further comprises:
  calculating, when the first acceleration does not fall within the smooth-travel acceleration range, if the first acceleration is less than a minimum end point value of the smooth-travel acceleration range and the speed of the vehicle ahead is greater than the speed of the host vehicle, a second acceleration according to the current distance, the minimum safe distance, the speed of the vehicle ahead, and the speed of the host vehicle; and
  determining, if the second acceleration is a forward acceleration, that the target acceleration is 0, and controlling the host vehicle to maintain current traveling motion.

6. The method according to claim 1, wherein determining the reaction time according to the speed of the host vehicle comprises:
  determining, if the speed of the host vehicle is less than a preset speed value, the reaction time according to a ratio of the speed of the host vehicle to the preset speed value; and
  determining, if the speed of the host vehicle is not less than the preset speed value, the reaction time according to the speed of the host vehicle, the preset speed value, and a time coefficient.

7. The method according to claim 1, wherein determining the minimum safe distance according to the speed of the vehicle ahead, the speed of the host vehicle, and the reaction time comprises:
  calculating a brake sliding distance corresponding to the vehicle ahead according to the speed of the vehicle ahead;
  calculating a brake sliding distance corresponding to the host vehicle according to the speed of the host vehicle;
  calculating a reaction distance according to the speed of the host vehicle and the reaction time; and
  determining the minimum safe distance according to the reaction distance, the brake sliding distance corresponding to the vehicle ahead, and the brake sliding distance corresponding to the host vehicle.

8. The method according to claim 7, wherein calculating the brake sliding distance corresponding to the vehicle ahead according to the speed of the vehicle ahead, and calculating the brake sliding distance corresponding to the host vehicle according to the speed of the host vehicle comprises:
  obtaining a preset first brake acceleration corresponding to the host vehicle and a preset second brake acceleration corresponding to the vehicle ahead;
  calculating the brake sliding distance corresponding to the host vehicle according to the speed of the host vehicle and the first brake acceleration; and
  calculating the brake sliding distance corresponding to the vehicle ahead according to the speed of the vehicle ahead and the second brake acceleration.

9. The method according to claim 1, wherein obtaining the speed of the host vehicle, the speed of the vehicle ahead, and the current distance between the vehicle ahead and the host vehicle comprises:
  capturing video or image information in front of the host vehicle;
  identifying one or more vehicles and lane lines in the video or image information;
  determining the vehicle ahead corresponding to the host vehicle according to positional relationships between the one or more vehicles and the lane lines;
  obtaining a relative speed between the vehicle ahead and the host vehicle and the current distance between the vehicle ahead and the host vehicle that are captured by a radar; and
  detecting the speed of the host vehicle, and determining the speed of the vehicle ahead according to the speed of the host vehicle and the relative speed.

10. A computer device, comprising: a memory and a processor, the memory storing a computer program, and the computer program, when executed by the processor, causing the processor to execute the computer program to perform:
  obtaining a speed of a host vehicle, a speed of a vehicle ahead of the host vehicle, and a current distance between the vehicle ahead and the host vehicle;
  determining a reaction time according to the speed of the host vehicle, the reaction time being positively correlated to the speed of the host vehicle;
  determining a minimum safe distance according to the speed of the vehicle ahead, the speed of the host vehicle, and the reaction time;
  calculating a buffer distance according to the speed of the host vehicle and a buffer parameter;
  calculating a target vehicle-following distance according to the minimum safe distance and the buffer distance;
  calculating a first acceleration according to the current distance, the target vehicle-following distance, the speed of the vehicle ahead, and the speed of the host vehicle;
  determining a target acceleration according to the first acceleration and a smooth-travel requirement; and
  controlling the host vehicle to travel according to the target acceleration.

11. The device according to claim 10, wherein calculating the first acceleration according to the current distance, the target vehicle-following distance, the speed of the vehicle ahead, and the speed of the host vehicle comprises:
  obtaining a speed adjustment time interval; and
  calculating the first acceleration according to a difference between the current distance and the target vehicle-following distance, a difference between the speed of the vehicle ahead and the speed of the host vehicle, and the speed adjustment time interval.

12. The device according to claim 10, wherein the smooth-travel requirement includes a smooth-travel acceleration range, and controlling the speed of the host vehicle according to the target acceleration further comprises:

calculating, when the first acceleration does not fall within the smooth-travel acceleration range, if the first acceleration is less than a minimum end point value of the smooth-travel acceleration range and the speed of the vehicle ahead is greater than the speed of the host vehicle, a second acceleration according to the current distance, the minimum safe distance, the speed of the vehicle ahead, and the speed of the host vehicle; and determining, if the second acceleration is a forward acceleration, that the target acceleration is 0, and controlling the host vehicle to maintain current traveling motion.

13. The device according to claim 10, wherein determining the reaction time according to the speed of the host vehicle comprises:

determining, if the speed of the host vehicle is less than a preset speed value, the reaction time according to a ratio of the speed of the host vehicle to the preset speed value; and determining, if the speed of the host vehicle is not less than the preset speed value, the reaction time according to the speed of the host vehicle, the preset speed value, and a time coefficient.

14. The device according to claim 10, wherein determining the minimum safe distance according to the speed of the vehicle ahead, the speed of the host vehicle, and the reaction time comprises:

calculating a brake sliding distance corresponding to the vehicle ahead according to the speed of the vehicle ahead;

calculating a brake sliding distance corresponding to the host vehicle according to the speed of the host vehicle;

calculating a reaction distance according to the speed of the host vehicle and the reaction time; and determining the minimum safe distance according to the reaction distance, the brake sliding distance corresponding to the vehicle ahead, and the brake sliding distance corresponding to the host vehicle.

15. The device according to claim 14, wherein calculating the brake sliding distance corresponding to the vehicle ahead according to the speed of the vehicle ahead, and calculating the brake sliding distance corresponding to the host vehicle according to the speed of the host vehicle comprises:

obtaining a preset first brake acceleration corresponding to the host vehicle and a preset second brake acceleration corresponding to the vehicle ahead;

calculating the brake sliding distance corresponding to the host vehicle according to the speed of the host vehicle and the first brake acceleration; and calculating the brake sliding distance corresponding to the vehicle ahead according to the speed of the vehicle ahead and the second brake acceleration.

16. The device according to claim 10, wherein the smooth-travel requirement includes a smooth-travel acceleration range, and controlling the speed of the host vehicle according to the target acceleration comprises:

determining that the target acceleration is 0, and controlling the host vehicle to maintain current traveling motion when the first acceleration falls within the smooth-travel acceleration range.

17. The device according to claim 10, wherein the processor is further configured to perform:

using, if the calculated first acceleration is greater than a preset first threshold, the first threshold as the first acceleration; and using, if the calculated first acceleration less than a preset second threshold, the second threshold as the first acceleration.

18. The device according to claim 10, wherein obtaining the speed of the host vehicle, the speed of the vehicle ahead, and the current distance between the vehicle ahead and the host vehicle comprises:

capturing video or image information in front of the host vehicle;

identifying one or more vehicles and lane lines in the video or image information;

determining the vehicle ahead corresponding to the host vehicle according to positional relationships between the one or more vehicles and the lane lines;

obtaining a relative speed between the vehicle ahead and the host vehicle and the current distance between the vehicle ahead and the host vehicle that are captured by a radar; and detecting the speed of the host vehicle, and determining the speed of the vehicle ahead according to the speed of the host vehicle and the relative speed.

19. A non-transitory computer-readable storage medium, storing computer program, the program, when being executed by a processor, cause the processor to perform:

obtaining a speed of a host vehicle, a speed of a vehicle ahead of the host vehicle, and a current distance between the vehicle ahead and the host vehicle;

determining a reaction time according to the speed of the host vehicle, the reaction time being positively correlated to the speed of the host vehicle;

determining a minimum safe distance according to the speed of the vehicle ahead, the speed of the host vehicle, and the reaction time;

calculating a buffer distance according to the speed of the host vehicle and a buffer parameter;

calculating a target vehicle-following distance according to the minimum safe distance and the buffer distance;

calculating a first acceleration according to the current distance, the target vehicle-following distance, the speed of the vehicle ahead, and the speed of the host vehicle;

determining a target acceleration according to the first acceleration and a smooth-travel requirement; and controlling the host vehicle to travel according to the target acceleration.

* * * * *